(12) United States Patent
Ryan

(10) Patent No.: US 6,422,593 B1
(45) Date of Patent: Jul. 23, 2002

(54) SUPPLEMENTAL RESTRAINT ASSEMBLY FOR AN AUTOMOBILE

(75) Inventor: Shawn Gregory Ryan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/476,061

(22) Filed: Dec. 30, 1999

(51) Int. Cl.⁷ .............................................. B60R 21/22
(52) U.S. Cl. .................................................. 280/730.2
(58) Field of Search .......................... 280/730.2, 743.2, 280/749

(56) References Cited

U.S. PATENT DOCUMENTS

| | | | | |
|---|---|---|---|---|
| 4,900,596 A | * | 2/1990 | Peacock | 428/34.5 |
| 5,439,248 A | * | 8/1995 | Steffens, Jr. et al. | 280/730.2 |
| 6,045,154 A | * | 4/2000 | Walton et al. | 280/728.3 |
| 6,073,961 A | * | 6/2000 | Bailey et al. | 280/730.2 |
| 6,095,551 A | * | 8/2000 | O'Docherty | 280/730.2 |
| 6,152,481 A | * | 11/2000 | Webber et al. | 280/730.2 |
| 6,168,191 B1 | * | 1/2001 | Webber et al. | 280/730.2 |
| 6,168,193 B1 | * | 1/2001 | Shirk et al. | 280/730.2 |
| 6,176,515 B1 | * | 1/2001 | Wallner et al. | 280/730.2 |

FOREIGN PATENT DOCUMENTS

| | | | |
|---|---|---|---|
| EP | 0950580 A2 | 2/1996 | |
| EP | 786382 A1 | * 7/1997 | B60R/21/16 |
| JP | 10157546 A | * 6/1998 | B60R/21/20 |

* cited by examiner

Primary Examiner—Lanna Mai
Assistant Examiner—Paul Royal, Jr.
(74) Attorney, Agent, or Firm—Kathryn A. Marra

(57) ABSTRACT

A side-impact air bag having an internal self-tensioning tether/lace interlaced within the side air bag. The side air bag is secured to the vehicle along the roof rail between the front and rear pillars. The tether or lace is secured to the air bag and traverses a plurality of predetermined guide points disposed within the air bag. When the side impact air bag is inflated the distance between the guide points increases and any slack in the tether/lace is taken up. Moreover, the air bag assembly is formed with a pair of legs that are either pulled into or clustered about the airbag during inflation to enhance curtain stability. Thus, the stability of the air bag is improved.

27 Claims, 7 Drawing Sheets

SUPPLEMENTAL RESTRAINT ASSEMBLY FOR AN AUTOMOBILE

TECHNICAL FIELD

This invention relates to a supplemental restraint assembly for an automotive vehicle, and more particularly to a side impact air bag assembly.

BACKGROUND

Air bags mounted in an instrument panel or steering wheel to protect an occupant from a front impact have become typical in the automotive industry. Numerous variations of these air bags, deployment systems and housing devices have evolved over the years. It is also known to provide protection to the occupant during a side impact.

These side impact air bags are often mounted adjacent the vehicle's roof rail, doorframe or center pillars, the occupant's seat, or in some instances within the side door. In some circumstances, it may desirable to have tensioning to position the bag during side impact as well as any secondary events.

Conventional side impact air bag systems employ a series of seams and tethers to provide tensioning. FIGS. 7A and 7B depict a side impact air bag 1 of the related art. The air bag 1 has a top edge 3 and a lower edge 4. Front tether 5 and rear tether 6 connect the inflatable element 2 to corresponding front and rear pillars of an automobile. The top edge 3 has a plurality of mounting connections 7 for connection to the vehicle's roof rail. The air bag 1 may have a plurality of straight substantially square zero length tethers 8 extending from the lower edge 4 to the top edge 3. FIG. 7B depicts the air bag of FIG. 7A in an inflated state. The inflatable element 2 shrinks when inflated and induces tension in the lower edge 4 and the tethers 5, 6. This tension tends to hold the air bag 1 in place relative to the vehicle. However, the amount that the lower edge 4 may constrict is limited and therefore, the amount of tension and take up in the tethers 5,6 is limited to the amount that the lower edge 4 constricts during inflation.

Thus, it would be desirable to provide an improved self-tensioning side air bag assembly having improved curtain stability.

SUMMARY OF THE INVENTION

It is an object of the invention to provide an improved supplemental restraint assembly that overcomes the drawbacks of and improves upon the related art.

The present invention is directed to a side impact air bag with an internal self-tensioning tether/lace interlaced within the side air bag. The side air bag is secured to the vehicle along the roof rail between the front and rear pillars. The tether or lace is secured to the air bag and traverses a plurality of predetermined guide points disposed within the air bag. When the side impact air bag is inflated the distance between the guide points increases and any slack in the tether/lace is taken up. Moreover, the air bag assembly is formed with a pair of legs that are either pulled into the airbag during inflation or clustered to enhance curtain stability. Thus, the air bag is stabilized to help improve curtain stability, and potentially to help to prevent ejection prevention and to help manage kinematics of the occupant's upper torso and head.

These and other benefits and advantages of the present invention will become apparent to those of skill in the art with reference to the following drawings and associated description set forth below.

DETAILED DESCRIPTION OF THE PREFERRED EMBODIMENTS

Figure 1:
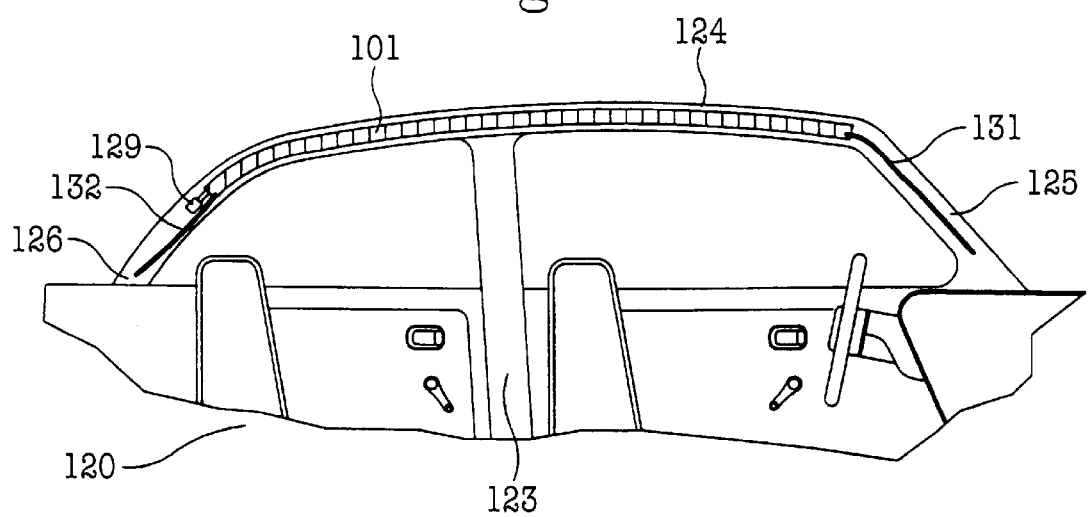
FIG. 1 is an elevation view of a side impact air bag of the present invention mounted to an automotive vehicle in a stored position.

FIG. 1 is directed to an air bag of the present invention mounted to an automotive vehicle in a stored non-deployed state. The automobile 120 has a front pillar 125, a rear pillar 126 and a center pillar 123. An air bag 101 which may also be referred to as an inflatable element is stored and mounted to the vehicle roof rail 124. A front portion 131 of a tether/lace 130 is connected to a front portion of the air bag 101 and to the front pillar 121. A rear portion 132 of the tether/lace 130 is connected to a rear portion of the air bag 101 and to the rear pillar 126. The rear portion of the air bag is connected to a gas generator 129, or a duct leading from a gas generator to facilitate ingress of gas to the air bag 101.

The air bag 101 is stored in a compartment mounted to the roof rail 124 as shown in FIG. 1. Front and rear portions 131, 132 of the tether/lace 130 are also stored in a compartment in a corresponding pillar 125, 126. When a side impact is detected, the air bag 101 is inflated by gas from generator 129. As the air bag 101 inflates, it drops downward and is positioned and retained by the tether/lace 130 at the pillars 125, 126 as well as by the point-wise mounting connections 107 disposed along the roof rail 124.

Figure 2A:
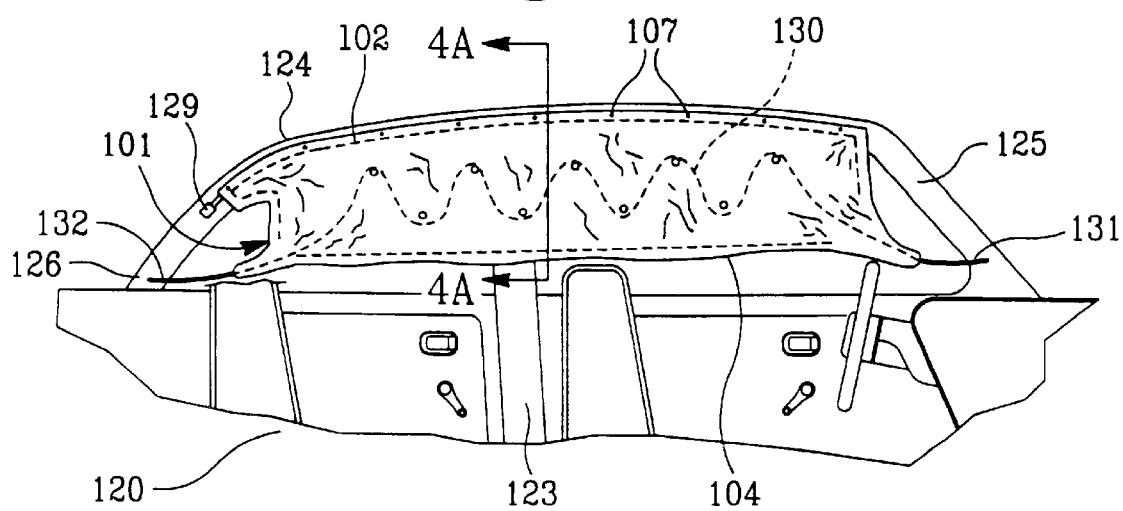
FIG. 2A is an elevation view of a side impact air bag according to one embodiment of the present invention mounted to a vehicle in a deployed non-inflated state.
Figure 2B:
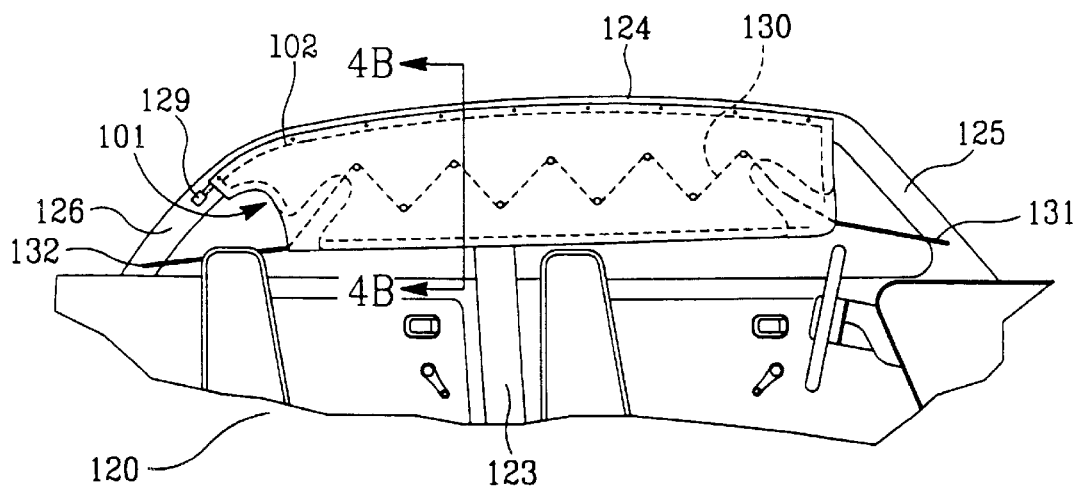
FIG. 2B is an elevation view of the side impact air bag of FIG. 2A in an inflated state.

With reference to FIGS. 2A and 2B, as gas fills the air bag 101, the air bag 101 expands and distance between a plurality of discretely positioned tether/lace guides increases. Thus, the length of the tether/lace 130 required to span the length of the air bag 101 increases. Consequently, any slack in the tether/lace existing when the air bag 101 descends from its stored position is taken up by the expanding air bag 101 and the increased distance between the tether/laced guides. Note that the tethers 131,132 are taut in the inflated state as shown in FIG. 2B. The air bag 101 is thereby positioned between the occupant and the door or window opening to protect the occupant from side impacts and subsequent events, such as rollover or secondary impact.

FIGS. 2A–2B is directed to a side impact air bag 101 of the present invention. Preferably the front and rear portions 131, 132 of the tether/lace secure the air bag 1 between the A-pillar 125 and C-pillar 126 spanning the B-pillar 123. However, the air bag 101 may extend more rearwardly and may be secured to a D-pillar of a longer vehicle. Furthermore, the airbag 101 may be employed only in the forward compartment of the vehicle and connected to the A-pillar and B-pillars. It is preferred, however, to employ a single air bag 101 for both the front and rear passenger compartments, and therefore connect the inflatable element to the A-pillar (or front pillar 125) and the C-pillar (rear pillar 126).

The air bag 101 may be of any suitable air bag material for holding gas, but is preferably made of a plurality of sheets of woven nylon fabric lined with urethane or other substantially impervious material such as silicone. The urethane coated nylon sheets are secured to one another along an outer periphery thereof to define the overall air bag shape. The sheets are connected along the seam pattern 102 shown in dotted lines in FIGS. 2A–2B. Preferably, the nylon sheets are secured to one another by heating selected portions of the fabric dialectrically. The urethane or silicone coating of each of the two nylon sheets is laid against each other and together line the interior of the air bag 101. The air bag 101 is then dialectrically treated to heat the outer causing the coating to adhere to one another. This forms a gas tight seal along the outer peripheral surface. The coated nylon sheets may also be stitched along the outer periphery to increase structural integrity sufficient to tolerate loads during inflation. When stitching is employed, it is preferred to treat the stitched area with a gas impervious substance to minimize gas leakage. Otherwise, the stress induced during inflation causes small holes in the stitching to widen and permit gas to escape thereby decreasing inflation time.

The front and rear portions 131, 132 of the tether/lace form a part of a single woven cord or fabric laced about a plurality of discrete points within the air bag 101. As the air bag 101 inflates, the distance between the discrete points increases and slack is taken up in the tether/lace. Note in the deflated state of FIG. 2A, the front and rear portions 131, 132 of the tether/lace are slack. However, when the air bag 101 is inflated as illustrated in FIG. 2B, any slack in the tether/lace between the front and rear portions 131, 132 is taken up and the tether/lace is taut thereby positioning the air bag 101 within the vehicle and holding the air bag 101 in place. The preferred embodiments for weaving the tether/lace about the air bag 101 will now be discussed.

Figure 3A:
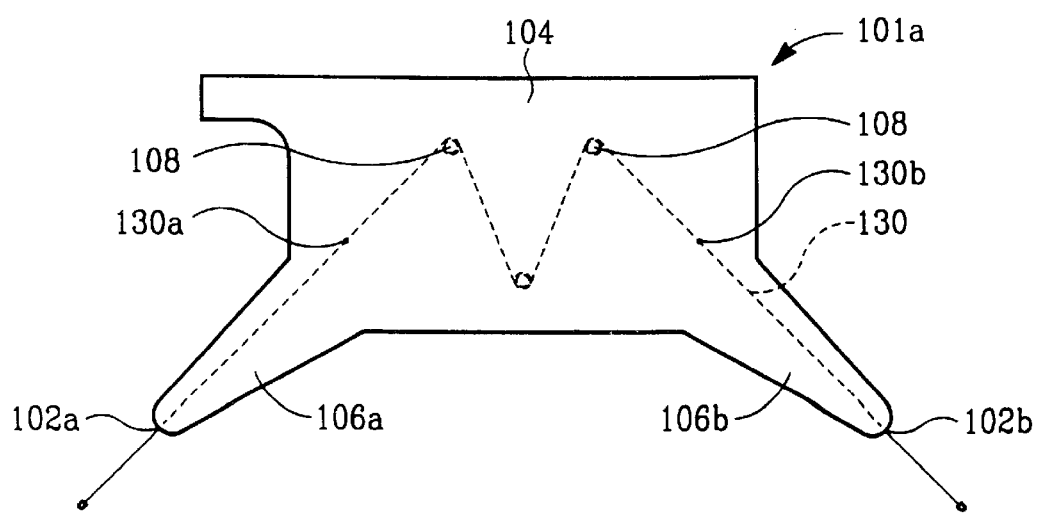
FIGS. 3A–3C show the preferred embodiment of the air bag of this invention as it is manufactured and assembled.

The manufacture and assembly of the air bar 101 of the present invention will now be described with references to FIGS. 3A–3C. FIG. 3A illustrates the shape of one air bag panel 101a prior to assembly. Panel 101a is cut to form a main body portion 104 and leg portions 106a, 106b. Sewn lace guides or equivalent lace guides 108 are added to the interior surface of the panel 101a. A minimum of three lace guides 108 should preferably be provided although more may be added depending on the shape and configuration of the panel 101a. Tether or lace member 130 is then routed between two panels 101a, 101b as will be discussed in greater detail below.

When the outside seam is sewn between the superimposed panels 101a, 101b, the lace 130 should cross the seam 102 such that point 130a on the lace 130 is affixed to point 102a on the seam 102. Likewise, point 130b on the lace 130 is affixed to point 102b on the seam 102.

Figure 3B:
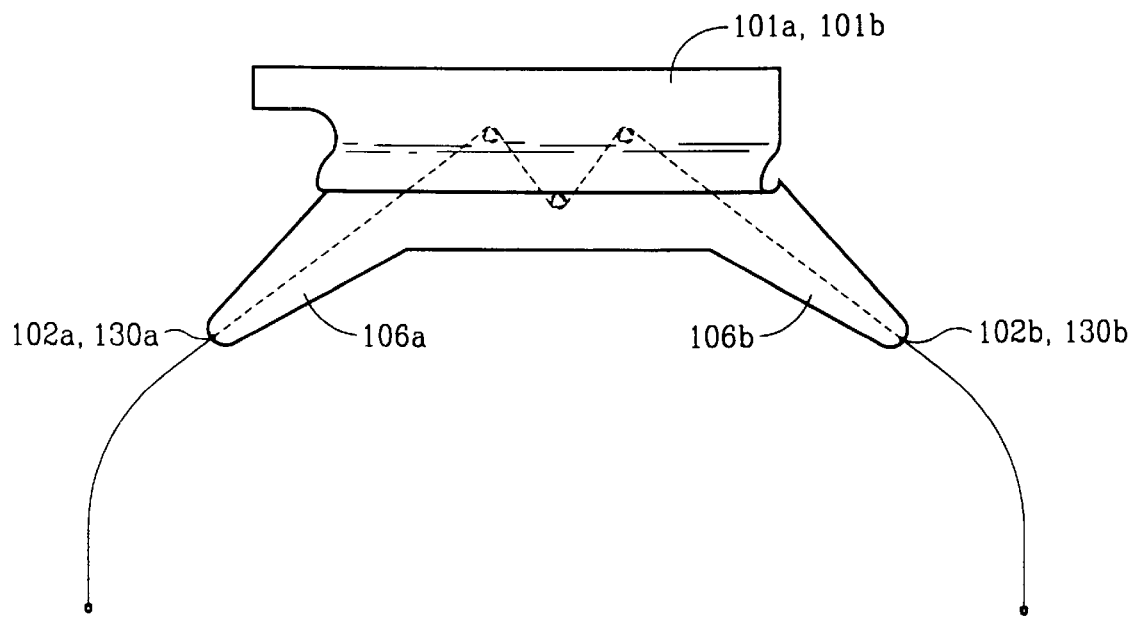

Turning now to FIG. 3B, after points 130a and 130b have been affixed to points 102a and 102b, respectively, the non-inflated air bag element 101 will have a puckered shape as illustrated in FIG. 3B. Because the leg portions 106a, 106b are secured to the lace 130 at a point along the lace 130 intermediate to the main body portion 104, a pucker or ripple in the air bag 101 will form.

Figure 3C:
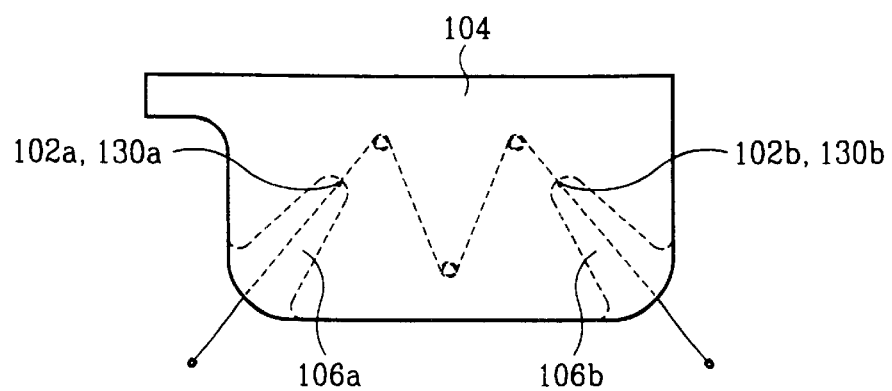

With reference to FIG. 3C, after inflation of the air bag 101, the internal pressure of the air bag 101 will force the lace guides apart and the points 102a, 102b, 130a and 130b may be pulled into or retained within the air bag main body portion 104. Alternatively, the points 102a, 102b, 130a, 130b may caused the leg portions 106a, 106b to become clustered during inflation. This arrangement will shorten the distance between the lace anchors at each end of the lace 130 and thus create increased tension. Therefore, the lace 130 will have sufficient tension while the air bag is being deployed, thus improving curtain stability, ejection prevention, and management of the occupant's upper torso and head kinematics.

Figure 4A:
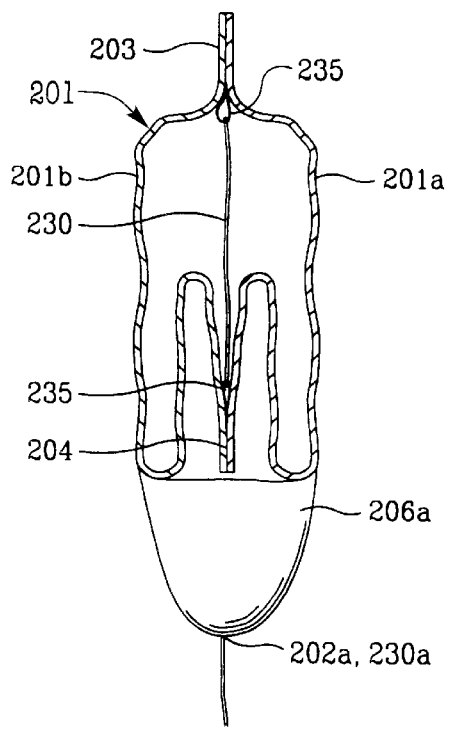
FIG. 4A is a cross sectional view of the side air bag of FIG. 2A taken along section lines 4A—4A.
Figure 4B:
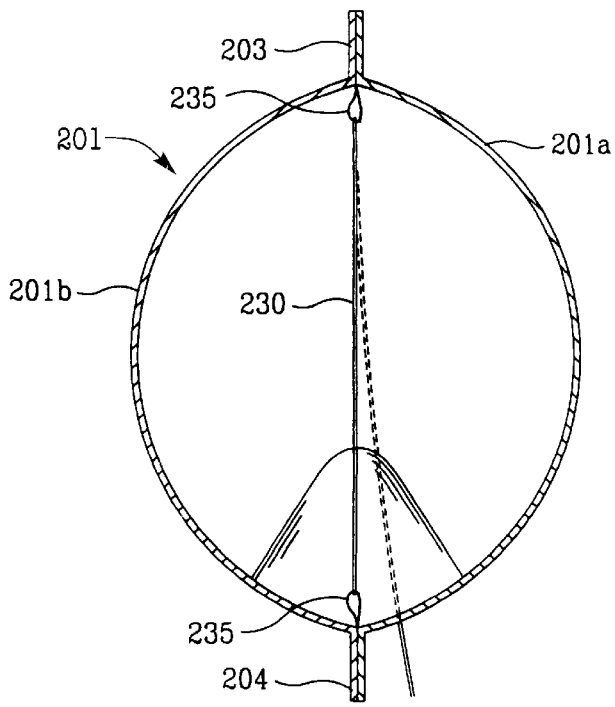
FIG. 4B is a cross sectional view of the side air bag of FIG. 2B taken along section lines 4B—4B.
Figure 4C:
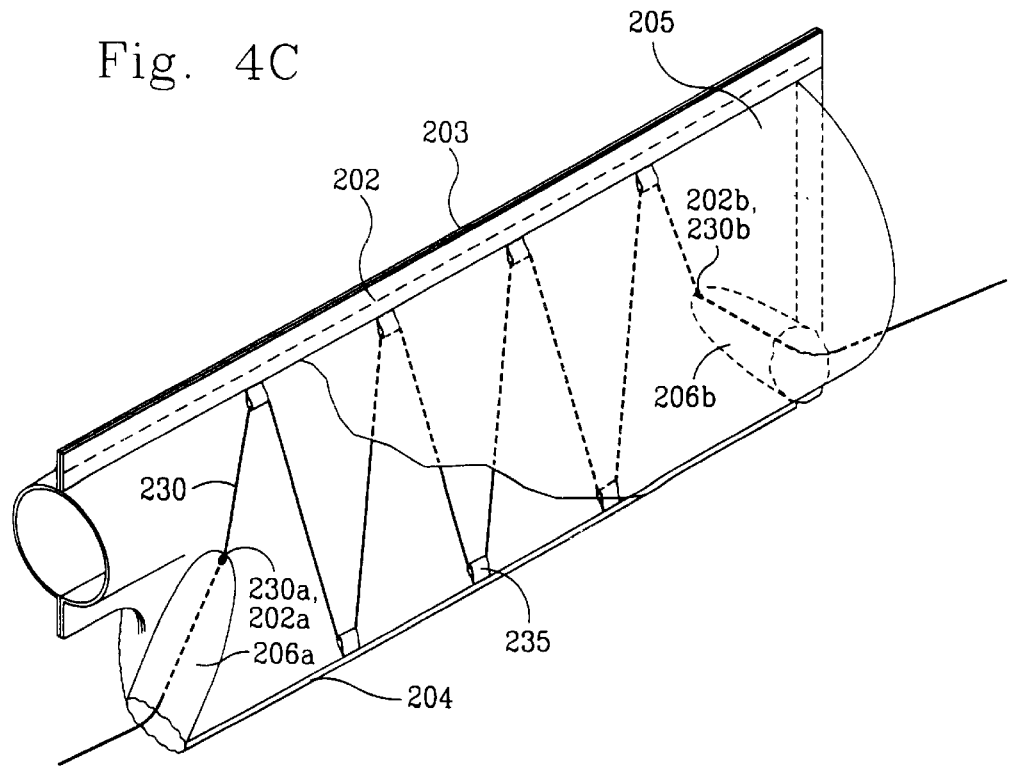
FIG. 4C is an elevational perspective view of the air bag of FIG. 2B.

FIG. 4A represents a cross sectional view of an air bag 201 of FIGS. 3A–3C shown in a deflated state. In this embodiment, the air bag 201 comprises two panels 201a, 201b. An inboard panel 201a is secured to an outboard panel 201b along a top edge 203 and bottom edge 204. As with the air bag shown in FIGS. 3A–3C, panels 201a, 201b are cut to form a main body portion 205 and leg portions 206a, 206b. A plurality of tether/lace guides 235 is formed along the inside surface of the inboard panel 201a. The guides 235 are preferably formed of fabric looped back onto itself and stitched to the inside of the air bag 201. The fabric guide 235 is preferably made of the same material as the air bag 201. The tether/lace 230 is simply fed through each fabric guide 235 traversing the inside of the air bag 201 between each successive guide 235 as illustrated in FIG. 4C. As in the previous embodiments, when the air bag 201 is deflated, the distance between the guides 235 is small whereas when the air bag 201 is inflated, the span increases requiring a greater length of the tether/lace 235 to span the overall length of the air bag 201.

When the outside seam is sewn between the panels 201a, 201b, the lace 230 should cross the seam 202 such that point 230a on the lace 230 is affixed to point 202a on the seam 202. Likewise, point 230b on the lace 230 is affixed to point 202b on the seam 202.

After inflation of the air bag 201, the internal pressure of the air bag 201 will force the lace guides 235 apart and the points 202a, 202b, 230a and 230b will be pulled into or clustered about the air bag main body portion 205 (see FIG. 4C). This arrangement will shorten the distance between the lace anchors at each end of the lace 230 and thus create increased tension. Therefore, the lace 230 will have provide tension while the air bag is being deployed, thus helping to improve curtain stability during initial and subsequent occupant impacts.

The arrangement of the internal lace guides 235 provides an added benefit as the tether/lace 235 may be secured to the inside of the air bag without the need for a zero length tether. If a grommet or slit were used as a guide 235 and the tether/lace 230 fed there through, some inflation gas could escape during air bag inflation. To avoid such a loss of inflation gas, a zero length tether may preferably be formed about the guide point should a grommet or simple slit be employed. The present embodiment eliminates the need for a zero length tether. However, the present embodiment does not exclude the use of a zero length tether and may so be employed together with the present arrangement. Moreover, the tether/lace 230 may be woven across the internal space defined by the air bag 201 thus connecting each side wall in a manner that will be discussed below with reference to an alternate embodiment.

Figure 5A:
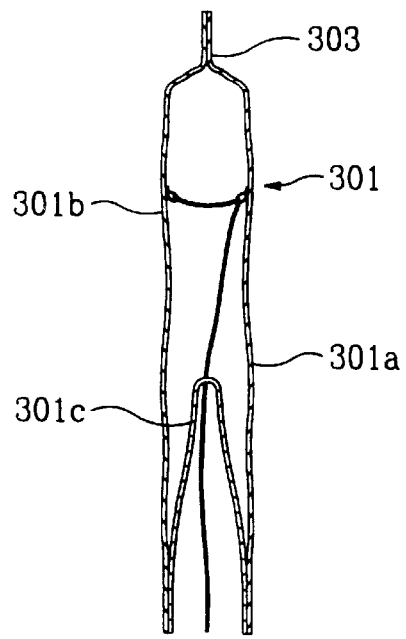
FIG. 5A is a cross sectional view the side air bag according to an alternative embodiment according to the present invention.

FIG. 5A represents another embodiment of the present invention and is a cross sectional view of a triangular air bag 301 in a deflated state. The air bag 301 is comprised of three panels 301*a*, 301*b*, and 301*c* sewn together. An inboard panel 301*a*, which faces the inner compartment of the vehicle, is sewn to an outboard panel 301*b* along a top edge 303 of the air bag 301. A bottom panel 301*c* is sewn to each of the inboard 301*a* and outboard 301*b* panel forming a connection there between and defining the boundaries of the air bag 301. A plurality of tether/lace guides 335 is formed along an interior portion of the bag 301. The tether/lace 330 is woven through the guides 335 to traverse the air bag 301 a number of times as the tether/lace 330 extends the length of the air bag 301 to emerge from the front and rear portions thereof 331, 332. The terminal ends of the tether/lace 331, 332 are suitable connected to the front and rear pillars 125, 126 respectively in a manner that is known in the art.

Figure 5B:
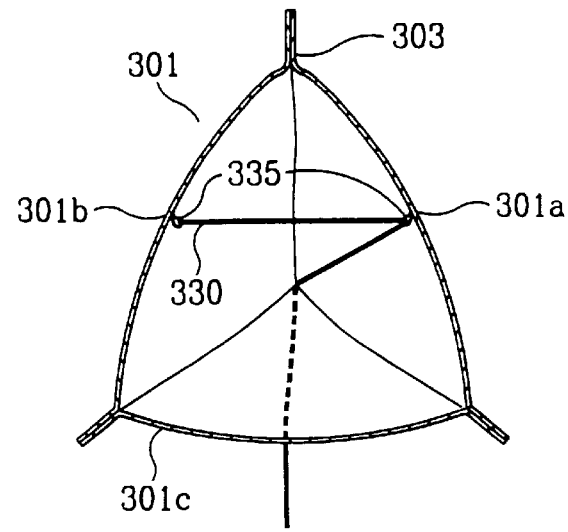
FIG. 5B is a cross sectional view of the air bag according to the alternate embodiment of FIG. 5A.
Figure 5C:
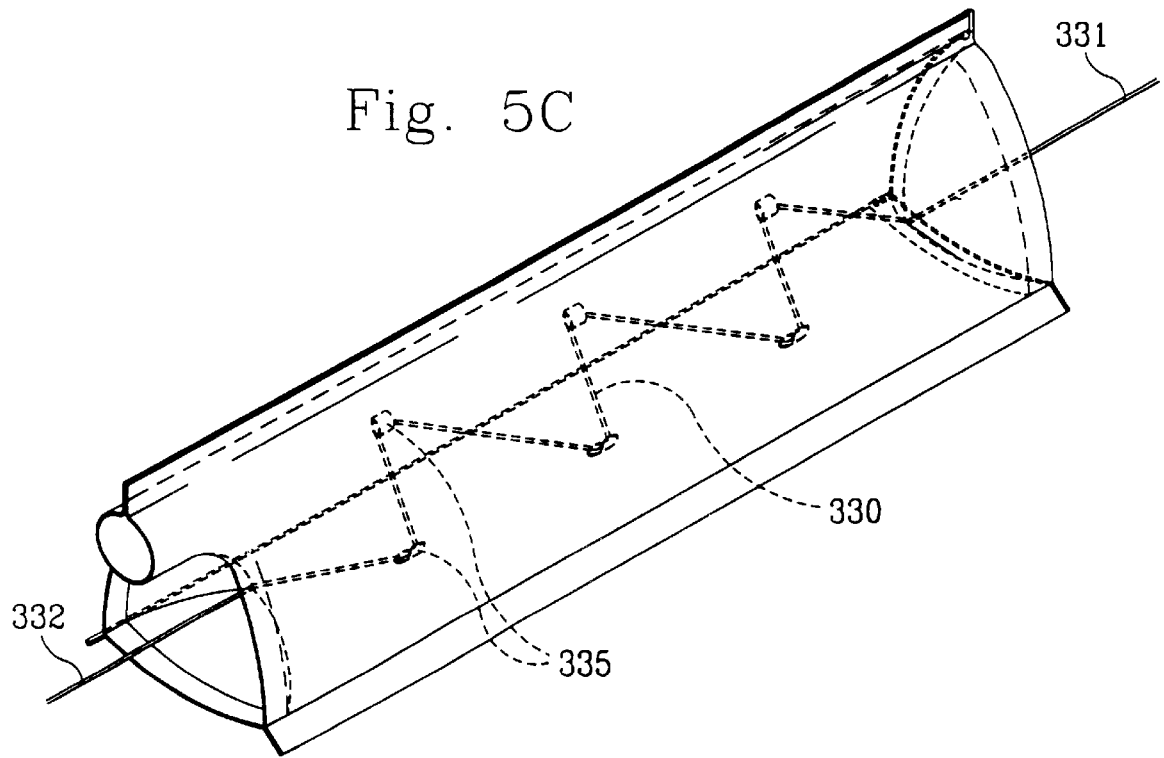
FIG. 5C is an elevational perspective view of the air bag of FIG. 5B.

As can be seen in FIG. 5A the distance between the inboard panel 301*a* and outboard panel 301*b* adjacent the bottom panel is relatively small in the deflated state. Such an arrangement allows the air bag 301 and tether/lace 330 to be stored up through the front and rear pillars 125, 126 and roof rail 124 in a non-deployed stored state. However, when the air bag is deployed, as shown in FIG. 5B, a smaller distance spans directly between the front and rear pillars 121, 122. Therefore, slack must be taken up during inflation to provide tension in the tether/lace 330 to maintain the air bag 301 in proper position.

Referring now to FIG. 5B, the air bag 301 is in an inflated state. Thus the distance between the tether/lace guides 335 on the inboard side of the air bag and the outboard side of the air bag is significantly greater. Thus, the distance the tether/lace 330 must span is increased and slack is therefore taken up. The distance that the tether/lace 330 traverses as the air bag inflates, above that of a straight line between the connection points of the front and rear pillars 125, 126, is greater than the increased distance that the tether/lace 330 must span when stored up through the front and rear pillars 125, 126 and across the roof rail 124. This facilitates easy storage of the air bag 301 and tether/lace 330 in the roof rail 124 while providing ample slack take up during air bag inflation. This results in an air bag 301 that is easily folded and stored in the roof rail and having sufficient tension in the tether/lace 330 when inflated to hold and maintain the air bag in a proper position.

Figure 6A:
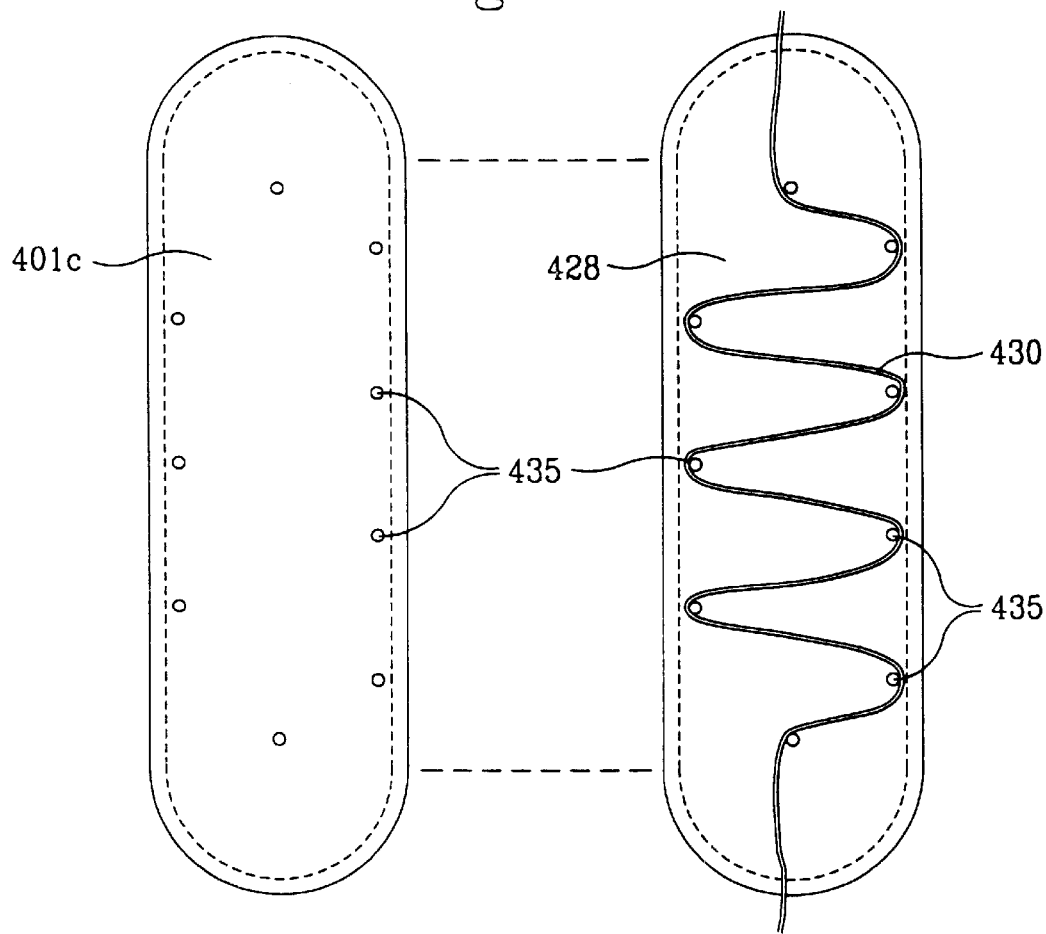
FIG. 6A is an exploded partial view of the bottom panel of the air bag according to an alternate embodiment in a deflated state.
Figure 6B:
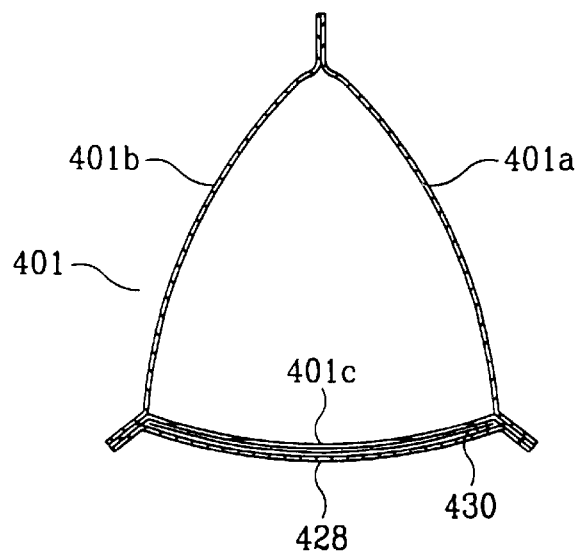
FIG. 6B is a cross sectional view of the air bag of FIG. 6A in an inflated state.
Figure 7A:
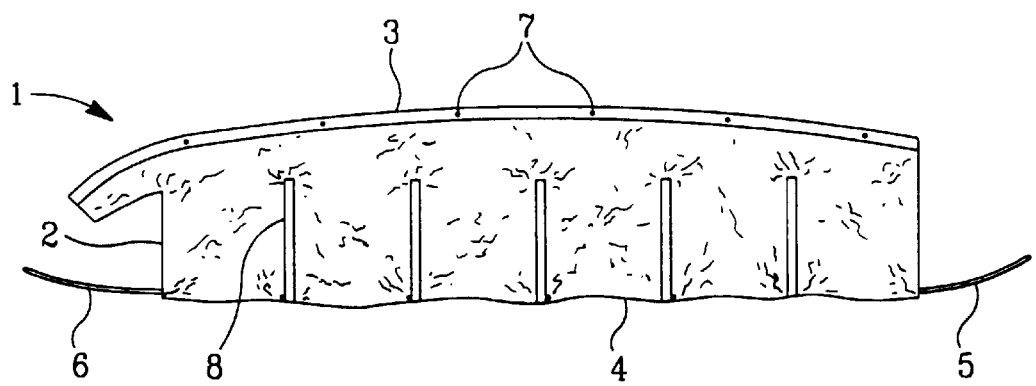
FIG. 7A is an elevation view of a side impact air bag of the related art in a non-inflated stated.
Figure 7B:
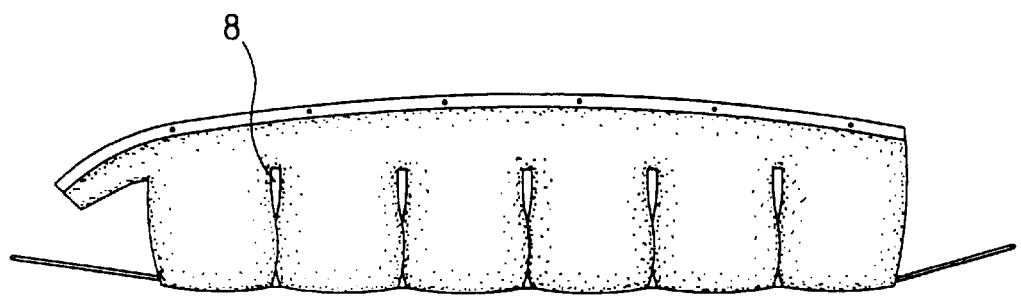
FIG. 7B an elevation view of the side impact air bag of FIG. 7A in an inflated state

FIGS. 6A and 6B represent an alternate embodiment for lacing the tether/lace 430 along the air bag 401. In this embodiment the tether/lace 430 traverses a plurality of discrete points or lace guides 435 in a serpentine fashion. The discrete points or lace guides 435 are formed by firmly stitching the bottom panel 401*c* and a protective cover 428 together at each of the lace guides/points 435. When the air bag 401 is uninflated, the inboard and outboard sides of the bottom panel 401*c* and protective cover 428 are closer together similar to the embodiment of FIG. 6A. Thus, the length of the tether/lace 430 needed to span the air bag 401 in a deflated/stored state is shorter than when inflated. Thus allows the tether/lace 430 to be stored up through the pillars 125, 126 and along the roof rail. When the air bag 401 inflates, the inboard and outboard sides of the bottom panel 401*c* and protective cover 428 move apart and the tether lace 430 must traverse the width of the bottom panel 401*c* a number of times proportionate to the number of guides 435. Increasing the number of guides 435 will increase the length of tether/lace 430 needed to span the air bag 401 and the amount of slack take-up during inflation. Such an arrangement eliminates the need for grommets and any exposure of the tether/lace 430 to the interior of the vehicle along the length of the air bag 401.

The material used for the tether/lace, in each of the aforementioned embodiments, may be that as is known in the art. A water-based Teflon coated thick nylon tape or other strong woven fabric or cord may be employed. It is preferable that the tether/lace have no substantial independent elastic properties. That is, the tether/lace should be able to endure the desired tension without significant elongation or substantially shrink when the tension is relieved. It is also desirable to have a strong flexible material having an external surface of relatively low frictional characteristics to facilitate easy movement relative to the air bag and guide points. It is also noted that the tether/lace may be secured to the pillars in any suitable fashion known in the art.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air bag for an automotive vehicle comprising:
   an inflatable element adapted to be inflated to an inflated state when connected to a gas generator and injected with pressurized gas, said inflatable element having a first fabric element defining a front part thereof and a second fabric element defining a back part thereof, wherein selected parts of said first and second fabric elements are interconnected along at least one seam;
   at least one tether member adapted to affix said inflatable element to said vehicle;
   wherein said at least one tether member is secured to said inflatable element at discrete locations along periphery of said inflatable element and along an interior surface of said inflatable element.

2. The air bag according to claim 1, wherein said inflatable element defines an inflatable main body portion and at least one inflatable leg portion, and wherein said tether member is affixed to an interior of said inflatable main body portion and said tether member is affixed to said leg portion adjacent to a location where said tether member passes from an interior of said inflatable element to an exterior of said inflatable element.

3. The air bag according to claim 1, further comprising a plurality of lace guides disposed along said interior surface, said lace guide securing said tether member to said interior surface of said inflatable element.

4. The air bag according to claim 1, wherein said at least one tether member connects a front portion of said inflatable element to a front pillar of said vehicle and a rear portion of said inflatable element to a rear pillar of said vehicle, and
   wherein said at least one tether member is affixed to said inflatable element at a pair of locations where said tether member passes from an interior of said inflatable element to an exterior of said inflatable element.

5. The air bag according to claim 1, wherein said at least one tether member passes into said main body portion and engages said main body portion at a plurality of lace guides disposed within said main body portion, whereby, when said inflatable element is in said inflated state, a distance between said lace guides is increased thereby inducing tension in said tether to positively position and retain said inflatable element relative to said vehicle.

6. The air bag according to claim 5, wherein said at least one inflatable leg portion is affixed to said at least one tether member along a seam disposed along a peripheral edge of said at least one inflatable leg portion.

7. The air bag according to claim 1, wherein said inflatable element comprises a pair of leg portions projecting into said main body portion in said inflated state, said pair of leg portions extending along a direction defined by said at least one tether member.

8. The air bag according to claim 1, wherein said at least one tether member extends from an anchor secured to said vehicle at an exterior of said inflatable element to a series of lace guides disposed along an interior of said inflatable element, said lace guides providing a plurality of attachment points between said tether member and said inflatable element.

9. The air bag according to claim 1, further comprising a plurality of lace guide engaging said tether along said interior surface, wherein said tether extends directly from said discrete locations along said periphery to said plurality of lace guides to provide tensioning of said tether in said inflated state.

10. An air bag for an automotive vehicle comprising:
   an inflatable element adapted to be inflated from an non-inflated state to an inflated state when connected to a gas generator and injected with pressurized gas, said inflatable element having an inflatable main body portion and at least one inflatable leg portion;
   a plurality of lace guides disposed within said inflatable element;
   a lace member extending from an exterior of said inflatable element to an interior of said inflatable element, said lace member engaging said plurality of lace guides,
   wherein said lace member extends across a first predetermined distance in said non-inflated state and said lace member extends across a second predetermined distance in said inflated state, said second distance being greater than said first distance.

11. The air bag according to claim 10, wherein a distance between each of said lace guides is increased from said non-inflated state to said inflated state.

12. The air bag according to claim 10, wherein said at least one leg portion is affixed to said lace member along a peripheral edge of said leg portion, whereby said leg portion is adapted to project away from said main body portion in said non-inflated state and said leg portion becomes clustered about said main body portion in said inflated state.

13. The air bag according to claim 10, wherein a top edge of said inflatable element is adapted to be secured to a roof rail of said vehicle, said lace member connects a front portion of a lower edge of said inflatable element to a front pillar of said vehicle, and said lace member connects a rear portion of said lower edge to a rear pillar of said vehicle, said inflatable element having at least one leg portion projecting into said main body portion or clustered about said main body portion in said inflated state thereby positively positioning said inflatable element relative to said vehicle to prevent injury to an occupant of said vehicle.

14. The air bag according to claim 10, wherein said lace member is secured to said inflatable element at discrete locations along a periphery of said inflatable element and along an interior surface of said inflatable element.

15. The air bag according to claim 10, wherein said lace member is affixed to an interior of said inflatable main body portion and said tether member is affixed to said leg portion adjacent a location where said lace member passes from an interior of said inflatable element to an exterior of said inflatable element.

16. The air bag according to claim 10, wherein, when said inflatable element is in said inflated state, a distance between said lace guides is increased thereby inducing tension in said lace member to positively position and retain said inflatable element relative to said vehicle.

17. The air bag according to claim 10, wherein said at least one inflatable leg portion is affixed to said lace member along a seam disposed along a peripheral edge of said at least one inflatable leg portion.

18. The air bag according to claim 10, wherein said inflatable element comprises a pair of inflatable leg portions projecting into said main body portion in said inflated state, said pair of leg portions extending along a direction defined by said lace member.

19. An air bag for use in an automotive vehicle comprising:
   an inflatable element adapted to be inflated into an inflated state when connected to a gas generator and injected with pressurized gas, said inflatable element having an interior surface;
   at least one tether member adapted to affix at least a portion of said inflatable element to said vehicle; and
   wherein said at least one tether member is secured to said inflatable element entirely within said interior surface of said inflatable element.

20. The air bag according to claim 19, wherein said inflatable element defines an inflatable main body portion and at least one inflatable leg portion, and wherein said tether member is affixed to an interior of said inflatable main body portion and said tether member is affixed to said leg portion adjacent a location where said tether member passes from said interior surface of said inflatable element to an exterior of said inflatable element.

21. The air bag according to claim 19, further comprising a plurality of lace guides disposed along said interior surface, said lace guide securing said tether member to said interior surface of said inflatable element.

22. The air bag according to claim 19, wherein said at least one tether member connects a front portion of said inflatable element to a front pillar of said vehicle and a rear portion of said inflatable element to a rear pillar of said vehicle, and
   wherein said at least one tether member is affixed to said inflatable element at a pair of locations where said tether member passes from said interior surface of said inflatable element to an exterior of said inflatable element.

23. The air bag according to claim 19, wherein said inflatable element includes a main body portion and wherein said at least one tether member passes into said main body portion and engages said main body portion at a plurality of lace guides disposed within said main body portion, whereby, when said inflatable element is in said inflated state, a distance between said lace guides is increased thereby inducing tension in said tether to positively position and retain said inflatable element relative to said vehicle.

24. The air bag according to claim 23, wherein said at least one inflatable leg portion is affixed to said at least one tether member along a seam disposed along a peripheral edge of said at least one inflatable leg portion.

25. The air bag according to claim 19, wherein said inflatable element includes a main body portion and wherein said inflatable element comprises a pair of leg portions projecting into said main body portion in said inflated state, said pair of leg portions extending along a direction defined by said at least one tether member.

26. The air bag according to claim 19, wherein said at least one tether member extends from an anchor secured to said vehicle at an exterior of said inflatable element to a series of lace guides disposed along said interior surface of said inflatable element, said lace guides providing a plurality of attachment points between said tether member and said inflatable element.

27. The air bag according to claim 26, further comprising a plurality of lace guide engaging said tether member along said interior surface, wherein said tether extends directly from discrete locations along said periphery to said plurality of lace guides to provide tensioning of said tether in said inflated state.

* * * * *